United States Patent [19]

Yamaguchi et al.

[11] Patent Number: 5,182,769
[45] Date of Patent: Jan. 26, 1993

[54] TELEPHONE SET HAVING A VOLATILE MEMORY

[75] Inventors: Kentoku Yamaguchi; Kenichi Sato, both of Hino, Japan

[73] Assignee: Kabushiki Kaisha Toshiba, Kawasaki, Japan

[21] Appl. No.: 598,401

[22] Filed: Oct. 18, 1990

[30] Foreign Application Priority Data

Oct. 19, 1989 [JP] Japan ............................... 1-272565
Nov. 13, 1989 [JP] Japan ............................... 1-294374

[51] Int. Cl.$^5$ ........................................... H04M 1/00
[52] U.S. Cl. ................................... 379/387; 379/413; 379/355; 379/356
[58] Field of Search .............. 379/413, 398, 399, 322, 379/323, 324, 387, 355, 356; 364/707; 371/14, 21.4, 66

[56] References Cited

U.S. PATENT DOCUMENTS

| 4,339,632 | 7/1982 | Early et al. | 379/355 |
| 4,380,687 | 4/1983 | Stewart | 379/413 |
| 4,532,382 | 7/1985 | Pommer, II | 379/413 |
| 4,560,841 | 12/1985 | Pierrel | 379/413 |
| 4,636,587 | 1/1987 | Zoerner | 379/413 |
| 4,636,588 | 1/1987 | Nakayama et al. | 379/413 |
| 4,647,787 | 3/1987 | Pommer, II | 379/413 |
| 4,653,088 | 3/1987 | Budd et al. | 379/413 |
| 4,763,333 | 8/1988 | Byrd | 371/66 |
| 4,922,529 | 5/1990 | Kiel | 379/387 |
| 5,034,915 | 7/1991 | Styrna et al. | 371/66 |

Primary Examiner—James L. Dwyer
Assistant Examiner—Jhancy Augustus
Attorney, Agent, or Firm—Finnegan, Henderson, Farabow, Garrett and Dunner

[57] ABSTRACT

A telephone set includes a volatile memory (14) for storing data such as telephone numbers or messages and a battery (17) for maintaining the data stored in the volatile memory (14). In order to prevent the data stored in the volatile memory (14) from being lost when the battery (17) is consumed, a detection circuit (18) detects the consumption of the battery (17) and supplies the voltage fed through a line from the telephone office side to the volatile memory (14) through a switch (19) on the basis of that detection. It is possible to transfer the data in the volatile memory to the non-volatile memory directly before the battery is consumed.

5 Claims, 5 Drawing Sheets

TELEPHONE SET HAVING A VOLATILE MEMORY

TECHNICAL FIELD

The present invention relates to telephone sets having a volatile memory for storing data such as telephone numbers or messages and more particularly to a telephone set in which no data in the volatile memory is lost when a battery for maintaining the data stored in the volatile memory is consumed.

BACKGROUND ART

Recently, telephone sets having a volatile memory which stores information such as telephone numbers or messages have been widely used. Such telephone sets include, for example, telephone sets having an abbreviated dialing function, automatic answering telephone sets, etc.

In a telephone set having an abbreviated dialing function, telephone numbers are registered in a volatile memory in terms of abbreviated telephone numbers of one or two digits. When an abbreviated number is dialed, the telephone number corresponding to the abbreviated number is read from the volatile memory and is sent to the telephone office.

However, the volatile memory is likely to lose its stored data inadvertently. Unless a voltage is continuously applied to the volatile memory, the memory cannot maintain its stored data. If the application of the voltage discontinued, the stored data is lost immediately. In place of the volatile memory, it may use a rewritable non-volatile memory. However, a rewritable non-volatile memory is more expensive than a volatile memory so that a telephone set becomes costly.

Therefore, a telephone set having an abbreviated dialing function generally uses a relatively inexpensive volatile memory (RAM) and a battery as a power source for maintaining the storage in the volatile memory. Such telephone set, however, has a problem that if the voltage of the battery is greatly reduced due to its consumption or the voltage applied to the volatile memory is interrupted temporarily at an occasion of the replacement with a new battery, the data stored in the volatile memory is lost undesirably.

An automatic answering telephone set is also generally uses a volatile memory to store messages to be sent to a caller. When there is an incoming call while the automatic answering function is set in operation, the message stored in the volatile memory is sent to the caller. When a message is received from the caller in response to the sent message the received message is stored in the storage unit provided in the telephone set, such as a tape recorder which uses a magnetic tape as a recording medium so as to be able to reproduce the received message.

Since an automatic answering telephone set includes such a storage unit which consumes large power, it uses a commercially available AC power supply service. Therefore, the data stored in the volatile memory is maintained by a voltage from the AC power supply service. In addition, a battery as a backup power source is provided in case that power supply from the AC power supply service is interrupted.

However, such automatic answering telephone set also has a Problem that if an AC power supply service is interrupted for a long time, the battery is consumed and its voltage becomes lowered enough to lose the data stored in the volatile memory To cope with this, if the capacity of the battery as the backup power source must be large. As a result, however, cost is increased and the space factor is degraded.

SUMMARY OF THE INVENTION

It is an object of the present invention to provide a telephone set in which no stored data in the volatile memory is lost even 11 the voltage of the battery is reduced due to the power consumption of the battery.

According to a first aspect of the present invention, a telephone set comprises a volatile memory for storing data, a battery for maintaining data stored by the memory, a detection circuit for detecting that the battery is consumed, and a telephone office side voltage supplying circuit responsive to a detection output :rom the detection circuit, for supplying to the volatile memory a voltage supplied from a telephone office side through a telephone line in place of the voltage of the battery.

By the first aspect of the Present invention, if the battery Is consumed, the voltage which is supplied through a line by the telephone office side is applied to the volatile memory to thereby prevent the stored data in the volatile memory from being lost.

According to a second aspect of the present invention, a telephone set comprises a volatile memory and a non-volatile memory for storing data, a battery for maintaining the data stored by the volatile memory, a detection circuit for detecting that the battery is consumed to an extent that the battery has a predetermined remaining power, and a control circuit, responsive to a detection output from the detection circuit, for transferring data stored in the volatile memory into the non-volatile memory by using the predetermined power remaining in the battery.

By the second aspect of the present invention, when the battery is consumed to an extent that the battery has only a predetermined remaining power, the data in the volatile memory is transferred into the non-volatile memory, so that no stored data in the volatile memory is lost.

DESCRIPTION OF THE PREFERRED EMBODIMENTS

Figure 1:
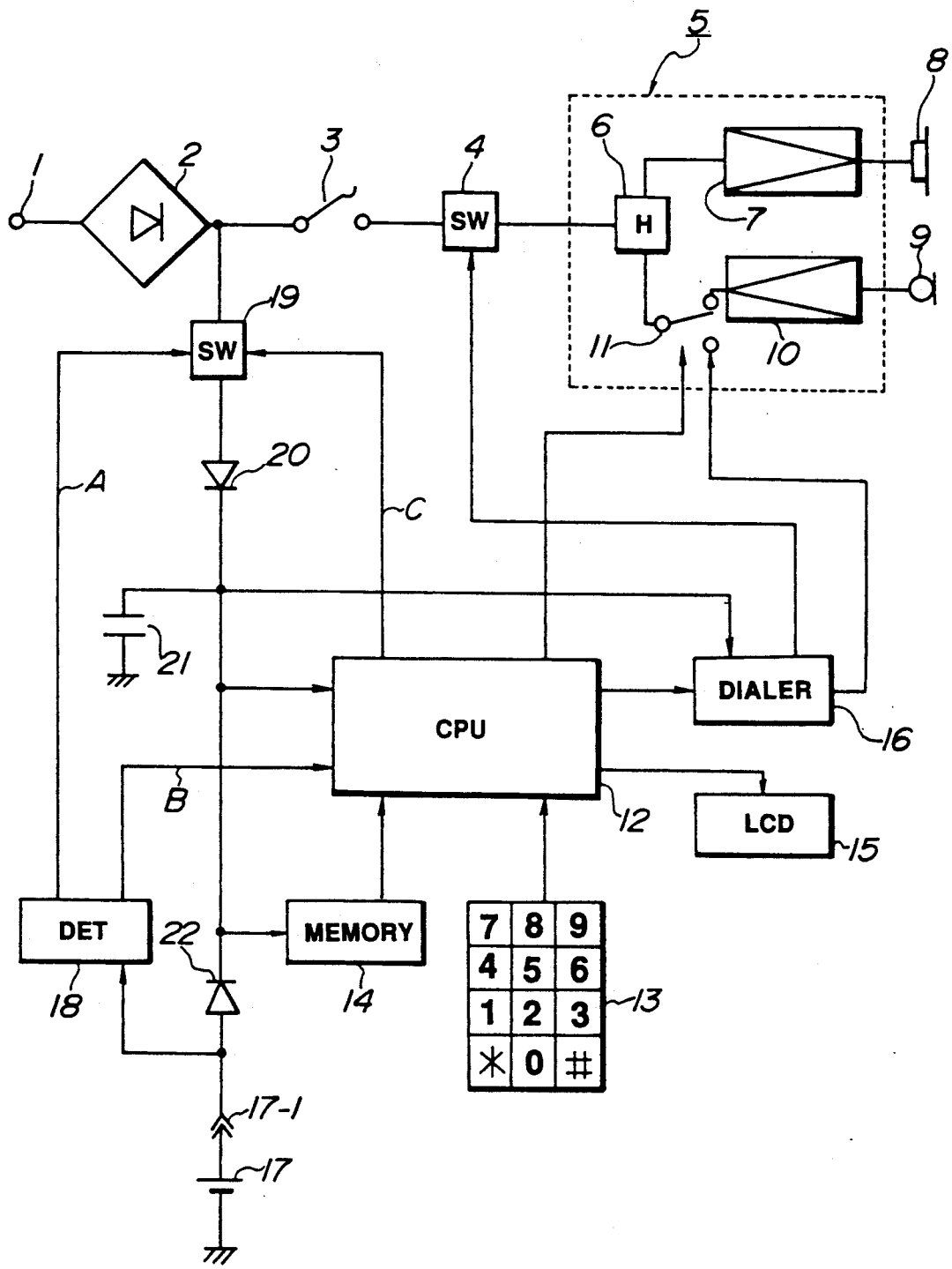
FIG. 1 is a block diagram of one embodiment of a telephone set including an example of a voltage detector according to the present invention.

FIG. 1 is a block diagram illustrating one embodiment of a telephone set according to the present invention and having an abbreviated dialing function.

In FIG. 1, a voice signal received through a modular jack 1 from a telephone line side is delivered through a rectifier 2, a hook switch 3 and a line switch 4 to a speech network 5. The speech network 5 receives the voice signal through a hybrid circuit 6 which makes a 2 to 4 line conversion and applies the received voice signal through the hybrid circuit 6 to a received signal output amplifier 7 which amplifies the received voice signal and delivers it to an ear piece 8. As a result, the ear piece 8 generates a voice indicative of the received voice signal.

If the user speaks into a mouth piece 9 for transmitting purposes, a transmitted voice signal is output from the mouth piece 9 and input to a transmission amplifier 10 where it is amplified and transmitted through a transmission switch 11 and a hybrid circuit 6. This transmitted voice signal is delivered through the line switch 4, hook switch 3 and rectifier 2 to the modular jack 1 from where the signal is sent to the telephone line.

The telephone set includes a central processing unit (hereinafter referred to as CPU) 12 which controls the respective elements of the telephone set, a key input unit 13 which keys in telephone numbers and abbreviated numbers, a volatile memory 14 which includes, for example, a random access memory (RAM) and stores a plurality of telephone numbers and abbreviated numbers corresponding to those telephone numbers, a liquid crystal panel 15 for display of a telephone number, for example, and a dialer 16 which sends a predetermined telephone number in accordance with a command from CPU 12.

When a call is to be placed using an abbreviated dialing function, an abbreviated number is input by the key input unit 13. This abbreviated number is reported to CPU 12. In response to this report, the CPU 12 reads the telephone number corresponding to the abbreviated number from the volatile memory 14, displays that telephone number on the liquid crystal panel 15 and causes the dialer 16 to send that telephone number to the telephone line.

The dialer 16 has a function of sending a telephone number even if any of a push button line and a dial pulse line is used as the telephone line. If the telephone line is a push button line, the dialer 16 switching the transmission switch 11 to the dialer side and sends a push button signal corresponding to the telephone number. The push button signal is sent through the hybrid circuit 6, closed line switch 4, closed hook switch 3, rectifier. 2 and modular jack 1 to the telephone line. If the telephone line is a dial pulse line, the dialer 16 repeatedly opens and closes the line switch 4 to thereby send a dial pulse signal corresponding to that telephone number. This dial pulse signal is sent to the telephone line through the closed hook switch 3, rectifier 2 and modular jack 1.

The telephone set further includes a battery 17 which feeds electrical power to the respective elements through a connection terminal 17-1, a voltage detector 18 which monitors the voltage of the battery 17 at all times, a telephone office power source switch 19 which applies a voltage from the telephone office line to the volatile memory 14, a reverse current preventive diode 20 which prevents a reverse current from flowing to the telephone office when the voltage on the telephone line is lower than that of the battery 17, for example, due to a reduction of the impedance of the telephone line on the side of the telephone office, a capacitor 21 which prevents the instantaneous interruption of the voltage applied to the volatile memory 14 which would otherwise occur when the orifice side power source switch 19 is switched, and a diode 22 which prevents a reverse current from flowing to the battery 17.

The operation of the telephone set performed when the battery 17 is to be replaced with a new one due to its power consumption will be described.

The voltage detector 18 detects a drop in the battery 17 voltage below a minimum (or preset) voltage to maintain the stored data in the volatile memory 14 and outputs a signal indicative of that voltage drop This voltage drop signal is applied to the office side power source switch 19 through a line A and also to CPU 12 through a line B.

In response to the voltage drop signal, the office side power source switch 19 is closed, so that the voltage on the telephone line on the central office side is applied to the volatile memory 14 through the modular jack 1, rectifier 2, office side power source switch 19 and reverse current preventive diode 2U. As a result, even if the battery 17 is consumed, the stored data or abbreviated dialing data in the volatile memory 14 is maintained by the voltage on the telephone line on the office side. The voltage on the office telephone line is applied not only to the volatile memory 14 but also to the CPU 12, dialer 16, etc., to thereby ensure their operations.

When CPU 12 receives the voltage drop signal from the voltage detector 18, the liquid crystal panel 15 displays that the old battery should be replaced with a new one. Since the office telephone line voltage continues to be applied to the volatile memory 14 even when the old battery is replaced in response to that display, no data on the abbreviated dialing numbers in the volatile memory 14 is lost.

When the battery replacement is thus made, the voltage detector 18 detects that the voltage of the new battery 17 is higher than the minimum voltage to maintain the stored data in the volatile memory 14, and outputs a voltage recovery signal indicating that the voltage is recovered. This signal is applied to the office side power source switch 19 through the line A and also to CPU 12 through the line B.

The office side power source switch 19 receives the voltage recovery signal to open and interrupt the line connection from the office telephone line to the volatile memory 14 to thereby stop the application of the voltage from the telephone line side to the memory 14, CPU 12, dialer 16, etc. When CPU 12 receives the voltage recovery signal, it erases the display on the liquid crystal panel 15 which prompts replacement of the battery.

As described above, since in the present embodiment the office side power source switch 19 is closed such that the office side telephone line voltage is applied to the volatile memory 14 when the battery 17 voltage drops below the minimum voltage to maintain the stored data in the volatile memory 14, no stored data in the volatile memory 14 is lost. When battery replacement is being made, the voltage on the office line is applied to the memory 14, and no stored data is lost Since the liquid crystal panel 15 displays that battery replacement should be made, the user can know the time when the battery should be replaced.

While in the present embodiment a voltage drop signal and a voltage recovery signal are delivered from the voltage detector 18 through the line A to the office side power source switch 19 to thereby close and open the office side power source switch 19, the office side power source switch 19 may be closed and opened under control of CPU 12. More particularly, when CPU 12 receives the voltage drop signal from the voltage detector 18, it controls the office side power source switch 19 through the line C to thereby close the switch 19. When CPU 12 receives a voltage recovery signal from the voltage detector 18, it controls the office side Power source switch 19 through the line C so as to close same.

Figure 2:
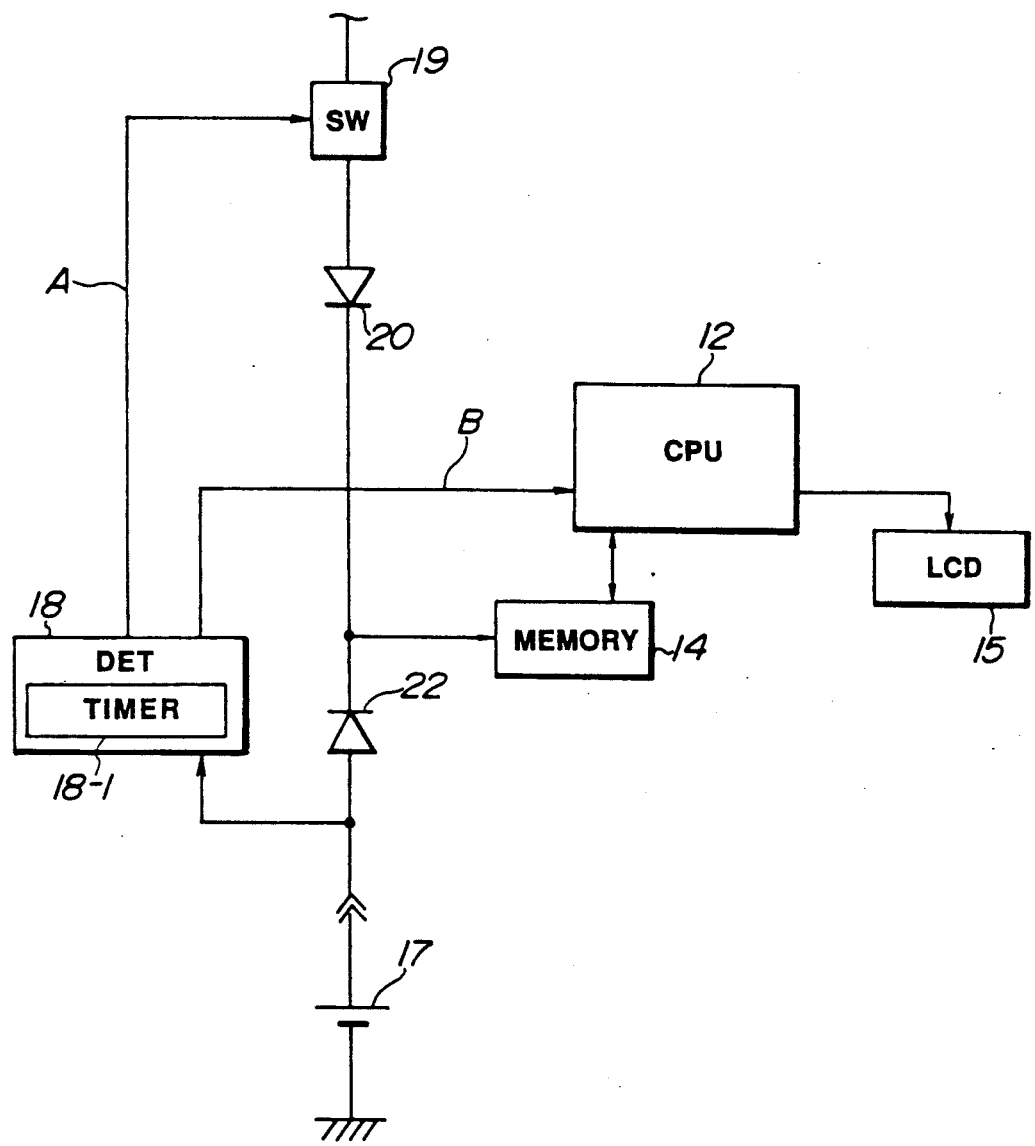
FIG. 2 is a block diagram of another example of the voltage detector in the embodiment of FIG. 1 in a simplified form.

While the voltage detector 18 of the above embodiment detects a drop in the battery 17 voltage below the minimum voltage to maintain the stored data in the volatile memory 14 so as to monitor the degree of consumption of the battery 17, this degree of consumption may be monitored on the basis of the total time during which the battery 17 is used. To this end, as shown in FIG. 2, a timer 18-1 is provided in the voltage detector 18 and started when the detector 18 detects a voltage in the battery replacement. The voltage detector 18 monitors the time in which the battery 17 is used and which the timer 18-1 counts If the time for the use of the battery reaches a preset time, the voltage detector 18 determines that the battery is consumed and sends a voltage drop signal to the office side power source switch 19 and CPU 12 and thus the office side power source switch 19 is closed and the liquid crystal panel 15 displays that the old battery should be replaced. Thereafter, when the battery 17 is removed and a new battery is inserted, the voltage detector 18 again detects the voltage of the battery and resets and starts the timer 18-1. At this time, a voltage recovery signal is sent from the voltage detector 18 to the office side power source switch 19 and CPU 12, so that the office side power source switch 19 is opened and the display on the liquid crystal panel 15 that the battery should be replaced is erased.

Figure 3:
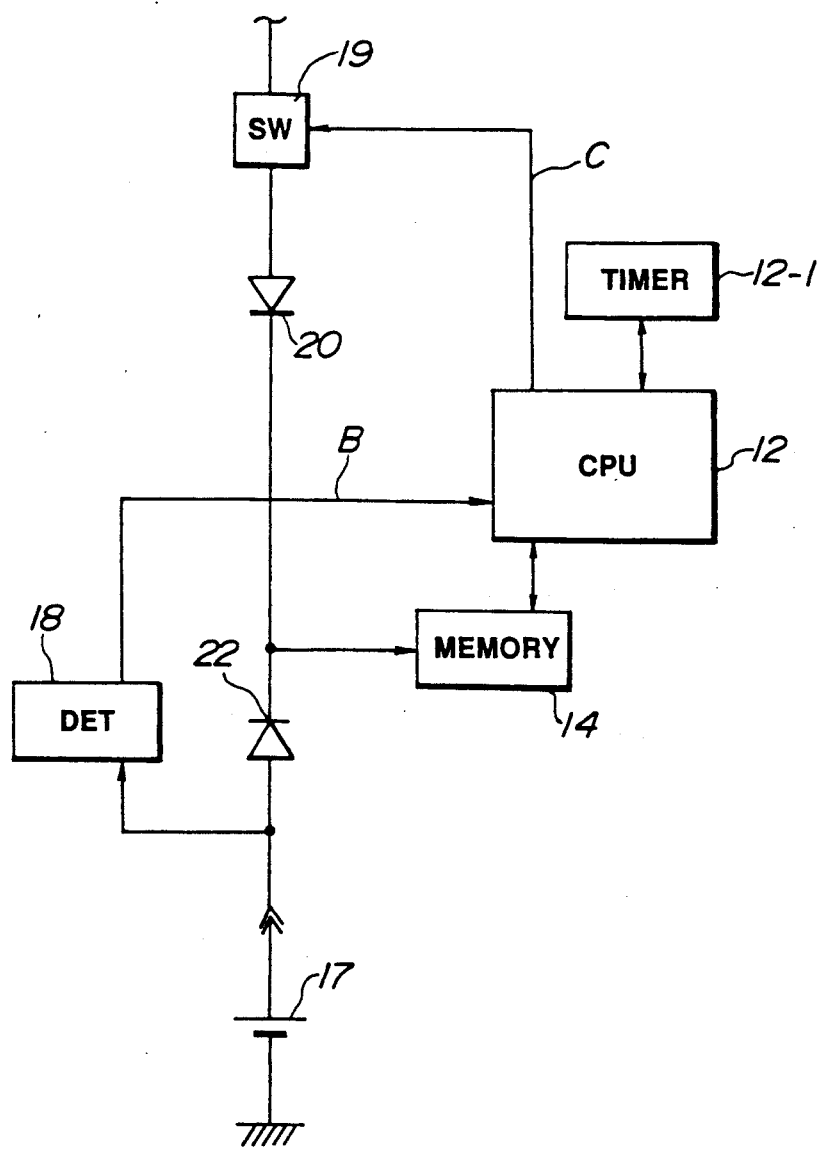
FIG. 3 is a block diagram of a simplified structure of the embodiment shown in FIG. 1 in which a time limit is set on the power supply from a telephone line.

When in the embodiment the office side power source switch 19 is closed and the telephone line voltage is applied to the volatile memory 14, the office side switching device may determine that the telephone set is in a so-called off-hook state depending on the state of the telephone line. In order to prevent the continuation of this state for an unnecessarily long time, the time for which the telephone line voltage is used may be limited. To this end, as shown in FIG. 3, CPU 12 may additionally have a timer 12-1 which is started by CPU 12 when the office side Power source switch 19 is closed or when CPU 12 receives a voltage drop signal from the voltage detector 18. CPU 12 counts, using the timer 12-1, the time for which the telephone line voltage is used. When this time reaches a preset time, CPU 12 opens the office side power source switch 19 to interrupt the current from the telephone line.

The orifice side power source switch 19 may be a constant voltage circuit which is capable of controlling the output from the switch 19. In this case, the output of the constant voltage circuit may be turned on and off in accordance with a voltage drop signal and a voltage recovery signal from the voltage detector 18.

Figure 4:
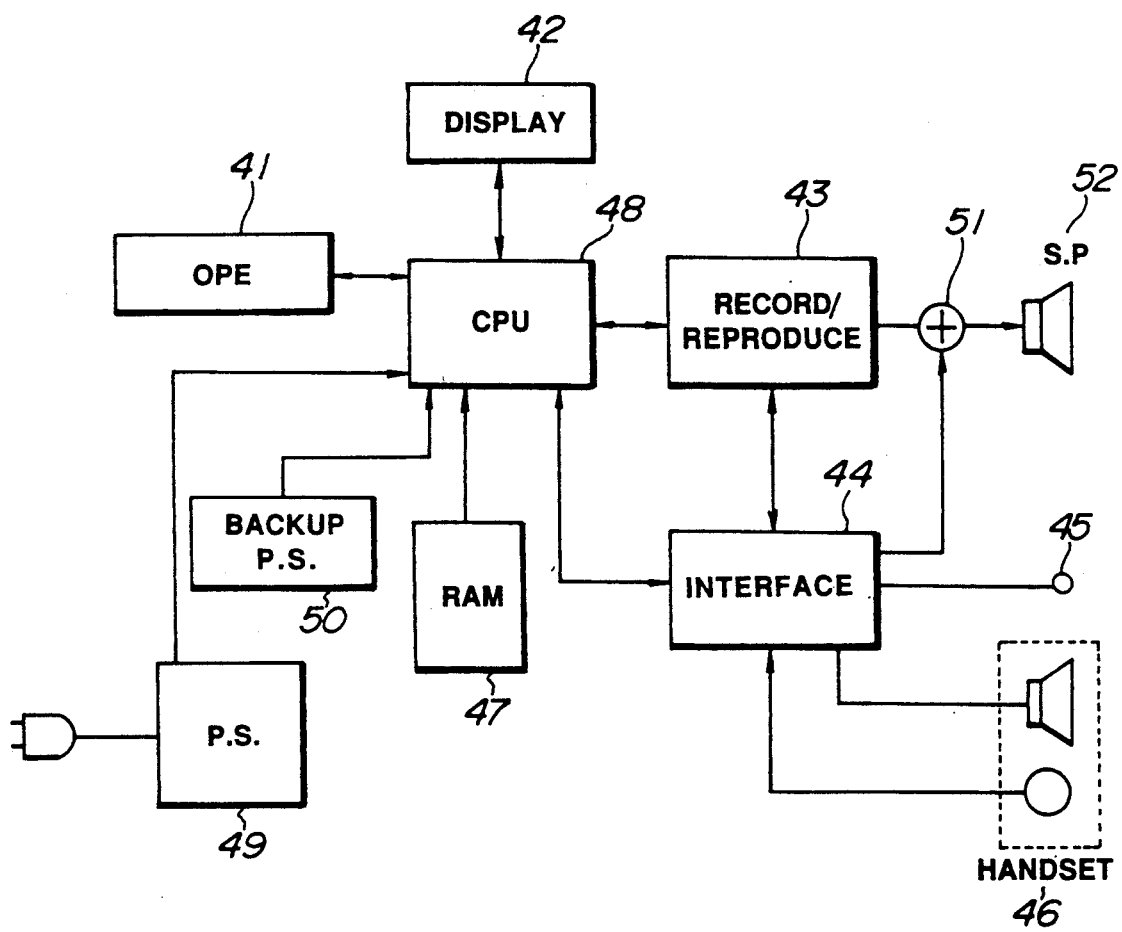
FIG. 4 is a block diagram of another embodiment of a telephone set according to the present invention.
Figure 5:
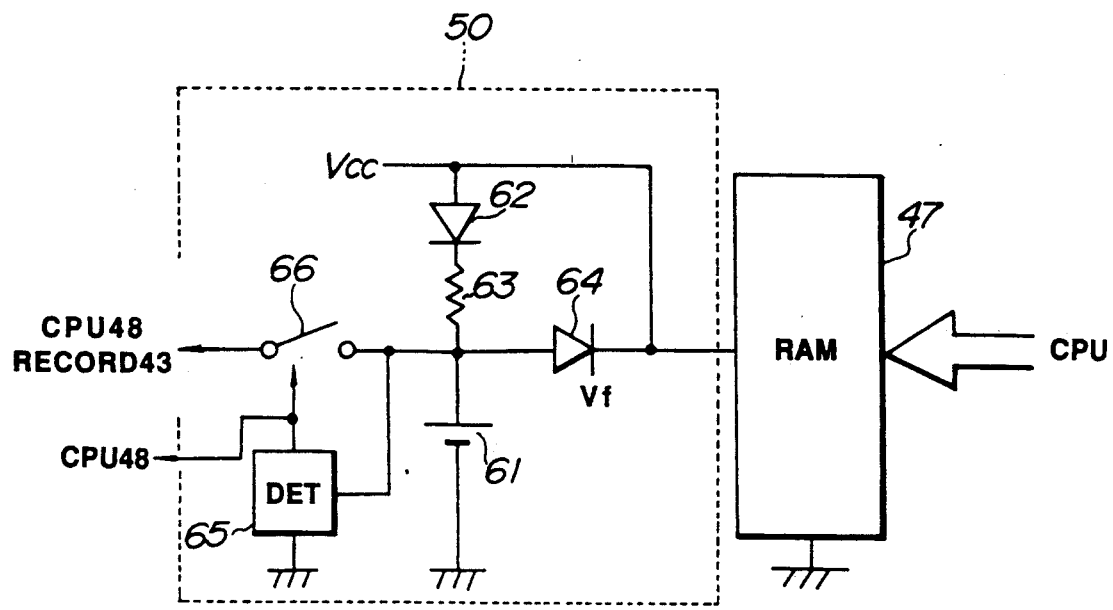
FIG. 5 is a diagram illustrating a backup power source in the embodiment of FIG. 4.
Figure 6:
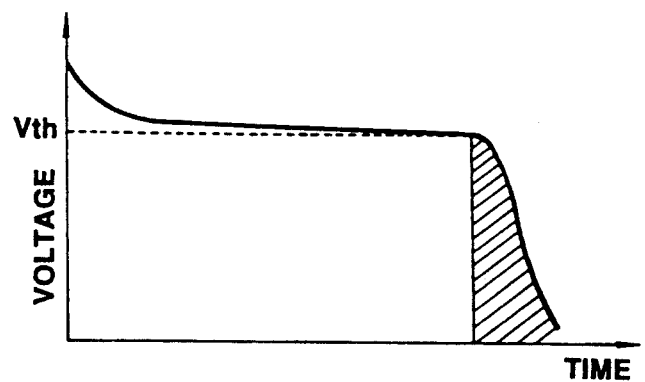
FIG. 6 is a graph illustrating a change in the voltage of the battery with time in the embodiment of FIG. 1.

Referring to FIGS. 4, 5 and 6, another embodiment of the telephone set according to the present invention will be described.

The telephone set of this embodiment is an automatic answering telephone set the structure of which is shown in FIG. 4. In FIG. 4, an operation unit 41 includes a ten-key unit which is used to key in telephone numbers and commands required for performing the various functions of the telephone set. A display 42 displays a telephone number, the state of the appropriate telephone set and a guide to the operation required for recording and reproducing messages. A recording and reproducing circuit 43 uses a cassette type magnetic tape as a recording medium to record and reproduce a message thereon. A telephone line interface 44 includes a hybrid circuit which performs a so-called 2 to 4 line conversion and acts as an interface to the telephone line connected to a modular jack 45. A handset 46 includes a mouth piece and an ear piece therein. A volatile memory 47 includes, for example, a random access memory (RAM) which stores messages to be sent, data on abbreviated dialing numbers and other data. A central processing unit (hereinafter referred to as CPU) 48 systematically controls the operation unit 41, display 42, recording and reproducing circuit 43 and telephone line interface 44.

In this arrangement, a normal power source 49 is connected to a commercially available AC power source and rectifies the AC voltage to a DC voltage which is fed to the telephone set for operating purposes. A backup power source 50 supplies a voltage to the volatile memory 47 and CPU 48 when power supply from the commercially available power supply service is interrupted.

The general operation of the automatic answering telephone set will be described hereinafter.

First, in usual telephone communication, the telephone line connected to the modular jack 45 is connected to the handset 46 through the interface 44. Thus, a telephonic communication may be made using the handset 46. The telephone line may be connected to a speaker 52 through the telephone line interface 44 and an adder 51 in which case telephonic communication is made through the handset 46, and the speaker 52 generates the corresponding voice.

If the telephone set is to be operated as an automatic answering telephone set, a message to be sent is required to be recorded beforehand. To this end, a command to the recording of the message to be sent is given to CPU 48 by operating the operation unit 41. In response to this, CPU 48 prepares for the start of storage in the volatile memory 47. Subsequently, if a message to be sent is input from the handset 46, the message is delivered through the telephone line interface 44 to the volatile memory 47 and stored there. Thus, after the message is stored, the operation unit 41 is operated to input to CPU 48 a command to the setting the automatic answering telephone function, CPU 48 puts the telephone set in the automatic answering state.

Thereafter, if there is an incoming call on the telephone line connected to the modular jack 45, the telephone line interface 44 detects this incoming call and informs CPU 48 of the reception of this incoming call. In response to this, CPU 48 commands the telephone line interface 44 to close a DC loop of the telephone line. CPU 48 reads the sent message from the volatile memory 47 and sends it to the telephone line through the telephone line interface 44.

Thus, sending the message, CPU 48 starts the recording and reproducing circuit 43 to maintain a recording state for a predetermined time during which if the recording and reproducing circuit 43 receives a message from the caller in response to the sent message, the received message is delivered through the telephone line interface 44 to the recording and reproducing circuit 43 where it si recorded on a magnetic tape therein. When the predetermined time has passed, CPU 48 commands the telephone line interface 44 to open the DC loop of the telephone line and hence terminate the telephone communication.

The message received from the caller and recorded in the automatic answering state can be reproduced by operating the operation unit 41. More specifically, by operating the operation unit 41 to command CPU 48 to reproduce the received message, CPU 48 starts the recording and reproducing circuit 43 to put same in a reproducing state. Thus, the recording and reproducing circuit 43 reproduces the received message recorded on the magnetic tape of cause the speaker 52 to broadcast the message.

The essential portion of the present embodiment or the operation of the present embodiment in which the volatile memory 47 is backed up when power supply from the commercially available AC power supply service is interrupted will be described.

FIG. 5 illustrates the structure of a backup power source 50 of FIG. 4. A rechargeable secondary battery 61 is impressed with a DC voltage Vcc from a normal power source 49 through a reverse current preventive diode 62 and a current limiting resistor 63 and hence charged. When the DC voltage Vcc drops below the forward voltage Vf of the diode 64, the secondary battery 61 starts to feed to the volatile memory 47. The voltage detector 645 which monitors the voltage of the secondary battery 61 detects that the secondary battery 61 is consumed and that its output voltage has reached a preset value.

When power supply from the commercially available AC power supply service is interrupted, the DC voltage Vcc fed by the normal power source 49 becomes zero, so that the voltage of the secondary battery 61 is applied to the volatile memory 47 through the diode 64 to thereby continue to maintain the stored data in the volatile memory 47 in spite of the power interruption of the commercially available AC power supply service.

When the power interruption of the AC power supply service continues for a long time, the voltage of the secondary battery 61 gradually lowers as shown by the graph of FIG. 6. In this case, when the voltage of the secondary battery 61 drops below the preset value Vth, the voltage detector 65 detects this fact and closes the switch 66. When the switch 66 is closed, the voltage of the secondary battery 61 is applied not only to the volatile memory 47 but also to CPU 48 and the recording and reproducing circuit 43 through the switch 66. Thus, CPU 48 and the recording and reproducing circuit 43 are rendered operable.

The voltage detector 65 informs CPU 48 that the voltage of the secondary battery 61 has dropped below the preset value Vth. In response to this, CPU 48 starts the recording and reproducing circuit 43 to put same in a recording state in which the stored data or messages to be transmitted, various data, etc., in the volatile memory 47 are stored on the magnetic tape in the recording and reproducing circuit 43 together with data on the identification of the memory. Thus, when the stored data in the memory 47 is transferred together with the data on the identification of the memory. Thus, when the stored data in the memory 47 to the recording and reproducing circuit 43, the secondary battery 61 is consumed, leaving small power.

The power remaining in the battery when the voltage of the secondary battery 61 has the value Vth is shown by the hatched portion in FIG. 6 and corresponds to the capacity required for saving the stored data in the volatile memory 47 into the recording and reproducing circuit 43. Therefore, if this saving is made, the secondary battery 61 is substantially consumed. Therefore, when saving the stored contents in the memory 47 into the recording and reproducing circuit 43 is completed, the stored data in the memory 47 will disappear.

Thereafter, when the commercially available AC power supply service is restored, the normal power source 49 restarts to feed power t the respective elements concerned. Since the voltage of the secondary battery 61 does not recover readily, the voltage detector 65 informs CPU 48 that the voltage of the second battery 61 is below the value Vth. The regular power source 49 informs CPU 48 that power supply is being made normally. At this time, CPU 48 determines that the stored data in the volatile memory 47 is saved in the recording and reproducing circuit 43 because the voltage of the secondary battery 61 is below the value Vth although normal power supply is being made by the power source 49. When CPU 48 makes that determination, it starts the recording and reproducing circuit 43 to put same in a reproducing state to retrieve the stored data recorded on the magnetic tape in the recording and reproducing circuit 43. In this retrieval, CPU 48 identifies the message to be sent, various data, saved from the memory 47, on the said of data on the identification of the memory, reads the message to be sent and the various data, and stores them in the volatile memory 47.

As described above, when power supply from the commercially available AC power supply service is interrupted in the present embodiment, the secondary battery 61 backs up the volatile memory 47. If the power interruption is prolonged, so that the secondary battery 61 is consumed to some extent, the stored data in the volatile memory 47 is saved into the recording and reproducing circuit 43. Thereafter, when power supply is recovered, the stored data saved in the recording and reproducing circuit 43 is returned to the volatile memory 47. Therefore, the stored data in the memory 47 is not lost. Since the secondary battery 61 is not required to perform a backup operation over a long time, it is not required to have an especially large capacity, advantageously.

What is claimed is:

1. A telephone set having a data storing function, comprising:
   volatile storage means for storing various user data;
   storage battery means for supplying a backup power source to the volatile storage means in order to hold the data stored in the volatile storage means;
   detection means for detecting a residual amount of power of the storage battery means, said detection means having a timer for measuring an accumulated use o time of the storage battery means;
   telephone office power supply extracting means for extracting a telephone office power source supplied from a telephone office side through a line;
   changeover means, when the time measured by the timer reaches a preset value for changing the source o power supplied from the storage battery means to the volatile storage means over to the source of power supplied from the telephone office power source extracted by the telephone office power source extracting means to the volatile storage means; and
   informing means for informing a fact that the residual amount of power of the storage battery means has dropped to the level below the preset value.

2. The telephone set according to claim 1 further comprising:

measuring means for measuring an elapsed time passed from a time point when the power supply is changed over to the power supply from the telephone office power source by the changeover means; and means for stopping the power supply from the telephone office power source to the volatile storage means when the time measured by the measuring means reaches a preset time.

3. A telephone set having a data storing function, comprising:

volatile storage means for storing various user data;

recording/reproducing means including a non-volatile memory, in an automatic answering mode, for storing a voice from a caller telephone set into the non-volatile memory and, in a reproduction mode, for reproducing the voice from the caller telephone set stored in the non-volatile memory;

storage battery means for supplying a backup power source to the volatile storage means in order to hold the data stored in the volatile storage means;

detection means for detecting a residual amount of power of the storage battery means, said detection means including a timer for measuring an accumulated use time of the storage battery means; and data hold means, when the time measured by the timer reaches a preset value, for reading out the data stored in the volatile storage means to apply the read-out data to the recording/reproducing means so as to write the data stored in the volatile storage means into the non-volatile memory of the recording/reproducing means.

4. The telephone set according to claim 3, further comprising driving means for driving said data hold means with the power supplied from the storage battery means.

5. The telephone set according to claim 3, further comprising data restoring means, when the residual amount of power of the storage battery means detected by the detection means is restored to a level higher than the preset value, for reading out the data written in the non-volatile memory of the recording/ reproducing means and restoring the read-out data back into the volatile storage means.

* * * * *

UNITED STATES PATENT AND TRADEMARK OFFICE
CERTIFICATE OF CORRECTION

PATENT NO. : 5,182,769
DATED : January 26, 1993
INVENTOR(S) : Kentoku Yamaguchi et al.

It is certified that error appears in the above-indentified patent and that said Letters Patent is hereby corrected as shown below:

Claim 1, column 8, line 58, change "o" to --of--.

Signed and Sealed this

Fourteenth Day of December, 1993

Attest:

BRUCE LEHMAN

Attesting Officer     Commissioner of Patents and Trademarks